United States Patent [19]
Tanaka

[11] Patent Number: 5,974,140
[45] Date of Patent: *Oct. 26, 1999

[54] INFORMATION CARRIER AND RECORDING AND/OR REPRODUCING APPARATUS AND/OR INITIALIZING APPARATUS

[75] Inventor: Shinichi Tanaka, Kyoto, Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/669,643

[22] Filed: Jun. 24, 1996

Related U.S. Application Data

[63] Continuation of application No. 08/137,622, Oct. 15, 1993, abandoned.

[30] Foreign Application Priority Data

Oct. 16, 1992 [JP] Japan .................................... 4-278399

[51] Int. Cl.⁶ .................................................. G11B 15/087
[52] U.S. Cl. .................................................. 380/4; 360/60
[58] Field of Search ............................ 380/4, 25; 360/60

[56] References Cited

U.S. PATENT DOCUMENTS

| | | |
|---|---|---|
| 4,588,991 | 5/1986 | Atalla . |
| 4,595,950 | 6/1986 | Löfberg .............................. 360/60 X |
| 4,785,361 | 11/1988 | Brothy . |
| 4,866,769 | 9/1989 | Karp ............................................ 380/4 |
| 5,057,947 | 10/1991 | Shimada . |
| 5,231,546 | 7/1993 | Shimada . |
| 5,267,311 | 11/1993 | Bakhoum .................................. 380/4 |
| 5,293,422 | 3/1994 | Loiacono .................................. 380/4 |
| 5,371,792 | 12/1994 | Asai et al. ................................ 380/3 |
| 5,379,433 | 1/1995 | Yamagishi .............................. 380/4 X |

FOREIGN PATENT DOCUMENTS

| | | |
|---|---|---|
| 0 286 437 A2 | 10/1988 | European Pat. Off. . |
| 0302710 | 2/1989 | European Pat. Off. . |
| 0 464 320 A2 | 1/1992 | European Pat. Off. . |
| 0464320 | 1/1992 | European Pat. Off. . |
| 61-137291 | 6/1986 | Japan . |
| 2-79260 | 3/1990 | Japan . |
| 3-179542 | 8/1991 | Japan . |
| 4-178798 | 6/1992 | Japan . |
| WO89/12890 | 12/1989 | WIPO . |
| WO 90/10292 | 9/1990 | WIPO . |
| WO90/10292 | 9/1990 | WIPO . |
| WO 92/16944 | 10/1992 | WIPO . |

OTHER PUBLICATIONS

EPO Search Report (93308231.5) dated Feb. 7, 1995.

*Primary Examiner*—Gilberto Barrón
*Attorney, Agent, or Firm*—Ratner & Prestia

[57] ABSTRACT

ID codes are given individually to each reproducing apparatus. An information carrier has a subsidiary storing area for recording reproduction-management-information (RMI) and ID codes can be registered in this area. When the ID code is registered, the reproducing apparatus is permitted to reproduce main information from the information carrier. When a reproducing apparatus with an unregistered ID code tries to reproduce the main information, the ID code of the reproducing apparatus itself is registered in the RMI of the information carrier and the main information is reproduced. The number of ID codes for permitting registration in the RMI is limited. When the area for registering the ID code is fully occupied, the main information cannot be reproduced by reproducing apparatuses that have unregistered ID codes. When the reproducing apparatus digitally copies the main information reproduced from the information carrier where the ID code of the reproducing apparatus is registered, the ID code of the reproducing apparatus is registered in the information carrier of the copy destination. An initializing apparatus for initializing the RMI in the information carrier accumulates the total number of ID codes registrable in the RMIs of the information carriers initialized by the initializing apparatus.

10 Claims, 12 Drawing Sheets

TABLE OF FIRST RMI

| ADDRESS | SIZE | CONTENTS |
|---|---|---|
| 00 | 1 Byte | NUMBER OF REGISTRABLE DRIVE-IDs |
| 01 | 1 Byte | BYTE NUMBER OF A ID CODE |
| 02~08 | 7 Bytes | ID REGISTRATION BLOCK No.0 |
| 09~0F | 7 Bytes | ID REGISTRATION BLOCK No.1 |
| 10~16 | 7 Bytes | ID REGISTRATION BLOCK No.2 |
| ⋮ | ⋮ | ⋮ |
| F7~FD | 7 Bytes | ID REGISTRATION BLOCK No.35 |
| FE~FF | 2 Bytes | CRC |

INFORMATION CARRIER AND RECORDING AND/OR REPRODUCING APPARATUS AND/OR INITIALIZING APPARATUS

This application is a continuation of application Ser. No. 08/137,622 filed Oct. 15, 1993 abandoned.

BACKGROUND OF THE INVENTION

The present invention generally relates to an information carrier and a recording/reproducing apparatus for specifying a reproducible apparatus in connection with software of music, video image and so on, and an apparatus for initializing the information carrier.

In recent years, various kinds of media of software for music, images and so on are supplied, and the protection of copyrights becomes a problem. The protection of the copyrights becomes especially an important problem, because information of digitalized music and images, and digital information such as programs, data, and so on of the computers are not substantially deteriorated if the information is repeatedly copied. A method of a copyright protection is disclosed in U.S. Pat. No. 5,231,546, where it is inhibited to make a second generation digital copy from a software whose copyright is protected but it is not inhibited to make a direct digital copy from the software.

In this method, there is a problem in that it cannot be inhibited for each user to copy. So long as a copying operation is effected directly from an original information carrier where information whose copyrights of music, images and so on should be protected is recorded, the number of the copying operation is limitless.

SUMMARY OF THE INVENTION

Accordingly, an essential object of the present invention is to provide an information carrier and a recording/reproducing apparatus for using the information carrier so that the information carrier where information whose copyrights of music, images and so on should be protected is recorded is adapted to inhibit from being circulated among many users, and a recording and reproducing apparatus using the management method of the reproducing operation and an initializing apparatus for storing information for managing the reproducing operation on the information carrier.

In accomplishing these and other objects, the present invention is adapted to register in a reproduction-management-information (RMI) to be recorded in a given location of the information carrier an individual ID code of the reproducing apparatus when the reproducing apparatus reproduces information from the information carrier. In order to reproduce the information from the information carrier, the reproducing apparatus read the RMI from the information carrier at first so as to investigate if the ID code of the reproducing apparatus is registered in it or not. Reproducing apparatuses which are permitted to reproduce information can be restricted by discriminating whether reproduction is permitted or not in accordance with the result of the RMI investigation. Namely, if the ID code of an apparatus is registered in the RMI, the apparatus is permitted to reproduce information. Preferably, an initial information carrier before reproduction is initialized so that the RMI may permit the registration of at least one of the ID codes. If the registration of the ID code is still permitted in the RMI of an information carrier, any reproducing apparatus can reproduce information from the information carrier. When a reproducing apparatus whose ID code is not registered in the RMI reproduce information from an information carrier, the apparatus reproduces the information and registers own ID code in the RMI. When the ID code is fully registered in the RMI, reproducing operation by the other reproducing apparatuses are inhibited although the reproducing apparatus(es) whose ID code(s) is (are) registered can reproduce the information any times from the information carrier.

In this manner, the copyrights can be effectively protected with avoidance of the reproduction of information by uncertain reproducing apparatuses through circulation of the information carrier where the information is recorded.

An initializing apparatus for initializing the information carrier is adapted to generate the RMI so that at least one of the above described recording/reproducing apparatuses may be permitted to register the own ID code in the RMI and also, adapted to accumulate total number of the ID codes permitted registration in the RMI.

In this manner, copyright toll can be charged in accordance with the total value of the ID codes permitted registration rent frequency. Even when the software is rented, the rented results can be grasped by the total value, and the charges can be correspondingly made.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
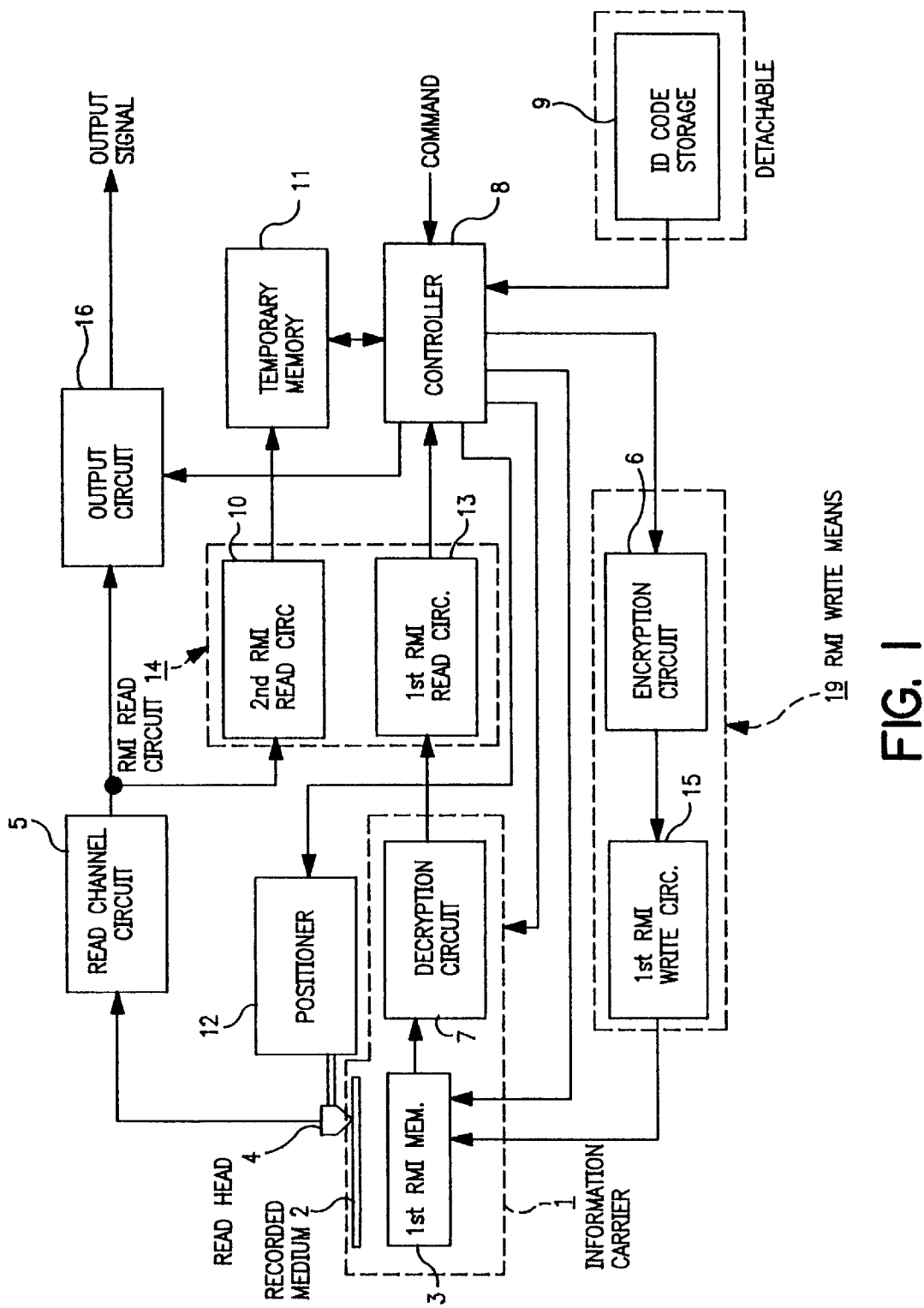
FIG. 1 is a block diagram showing an embodiment of a reproducing apparatus of the present invention.

Before the description of the present invention process, it is to be noted that like parts are designated by like reference numerals throughout the accompanying drawings.

Figures 2, 3:
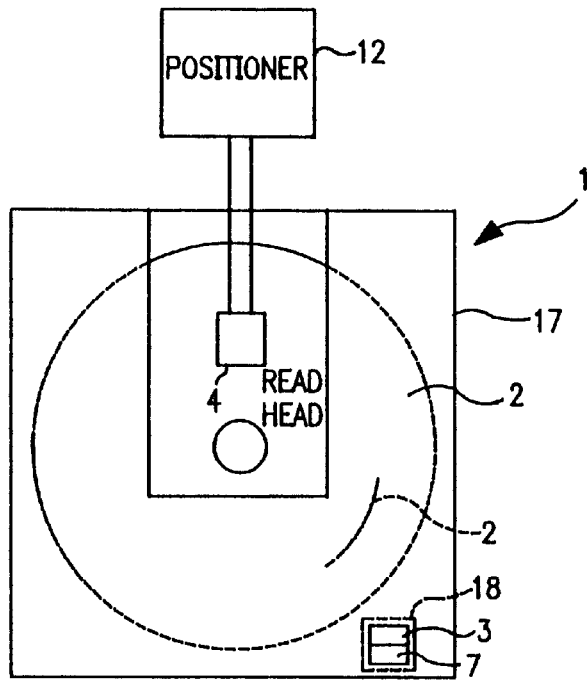
FIG. 2 is a conception view showing an embodiment of an information carrier of the present invention.
FIG. 3 is a table showing the contents of a first RMI in the embodiment of the present invention.

FIG. 1 is a block diagram of a preferred embodiment of a reproducing apparatus of the present invention, and FIG. 2 is a conception view showing the construction of information carrier 1 from which the reproducing apparatus reproduces information. The information carrier 1 is composed of a recorded medium 2 such as a disk where the main information useful for a user is recorded on the recording face, and a case 17 for accommodating the carrier together with a semiconductor IC 18 therein. The information carrier 1 includes a subsidiary recording area for recording a reproduction-management-information (RMI) which is divided in two RMIs, a first RMI to be recorded into a first RMI memory 3 included in the semiconductor IC 18 and a second RMI recorded into the recorded medium 2, the first RMI memory 3 and a portion of the recorded medium 2 where the second RMI recorded being composed of the subsidiary recording area. The ID code of the reproducing apparatus can be written into the first RMI, and, if the ID code is written into the first RMI, it is said that the reproducing apparatus having the ID code is registered onto the first RMI.

The second RMI recorded in the recorded medium 2 includes a key for encrypting the first RMI which can be written into the first RMI memory 3 included within the semiconductor IC 18 after encrypted on the basis of the key. The semiconductor IC 18 includes a decryption circuit 7 for decrypting the first RMI having been decrypted. The first RMI memory 3 can be composed of a PROM capable of a writable operation only one time, a substantially non-volatile semiconductor memory like an E-PROM capable of a rewritable operation, or ones which are a substantially non-volatile like a SRAM being backed up by a battery.

The first RMI composes a major portion of reproduction management for managing the reproducing operation of the reproducing apparatus, and includes a number of additionally registrable ID code(s), a number of bytes of an ID code, a registration portion for registering the ID code(s), and a cyclic redundancy check code (CRC) for checking errors of these information. The CRC may be consisted by ones such as an even parity or an odd parity for processing with byte units. The first RMI includes thirty-six registration blocks each of which stores an ID code consisting of seven bytes. The one information carrier can have a plurality of the RMIs, and the information portion corresponding to the one RMI is called as a unit information herein-after. The ID code is a kind of symbol given so as to be unique at every reproducing apparatuses or to be hardly equal to the ID code of any other reproducing apparatus. The reproducing apparatus(es) which is (are) registered in the first RMI is (are) permitted to reproduce the unit information corresponding to the RMI from the information carrier 1. In the initial state before the ID code(s) is (are) registered, a predetermined information which does not exist as the ID codes is recorded in every registration block which does permit registration of an ID code, and each of the other registration block(s) which does not permit registration of an ID code is filled with the other information. With such an arrangement that the predetermined information is written within the every registration block which does permit registration of an ID code, as it can be seen whether it is possible to register the ID code or not in addition by making a search for the registration block wherein the predetermined information is registered. In this case it is not necessary to included the number of registrable ID codes within the RMI. The predetermined information is preferably not a stationary information, but an individual code given to each unit information. This individual code is recorded within the second RMI, so that it can be prevented from rewriting unfairly the registration blocks so as to be registrable of the ID codes with an apparatus of simple construction only for rewriting the information of the first RMI.

The second RMI recorded within the recorded medium 2 includes a key for encrypting or decrypting the first RMI, an individual code for identifying the kind of each unit information, and the likes. If it is not necessary to restrict an apparatus for allowing the reproducing, any free-reproducing-information showing the free reproducing possibility can be also included within the second RMI. When it is allowed to be freely reproduced, the free-reproducing-information may be made by making the key a zero, because in this case the key for encrypting the RMI is not necessary.

The ID code given to the reproducing apparatus is stored in an ID code storage 9, for which a fused-ROM, a printed circuit wherein wiring is selectively cut, or the like may be applied. The ID code storage 9 preferably is detachable to the outside. A controller 8 is adapted to control the operation of reproducing apparatus on the basis of the ID code stored in the ID code storage 9 and the first RMI stored in the first RMI memory 3. As the first RMI is stored after encryption in the first RMI memory 3, a first RMI read circuit 13 reads out the first RMI through the decryption circuit 7 to send out to the controller 8 which is put the first RMI having been sent stored in a temporally memory 11.

The reproducing apparatus write the own ID code into one of the registration blocks in which the individual information is stored in order to register itself in the RMI. This operation is carried out on the temporally memory 11. After this registration the first RMI is read by the controller 8 and is put into the first RMI memory 3 by a first RMI write circuit 15 after encryption by a encryption circuit 6. The encryption circuit 6 and first RMI write circuit 15 compose of a RMI write means 19. The key for encrypting the first RMI is read out from the recorded medium 2. To read out the key, the controller 8 at least drives a positioner 12 to move a read head 4 to the subsidiary area on the recorded medium 2. The signal picked up by the read head 4 from the recorded medium 2 is sent to a second RMI read circuit 10 through a read channel circuit 5. The second RMI read circuit 10 extracts the second RMI including the key from the signal having been sent to store into the temporally memory 11. On the basis of the key, the encryption circuit 6 is adapted to encrypt the first RMI. The first RMI read circuit 13 and second RMI read circuit 10 compose a RMI read means 14.

Figure 4:
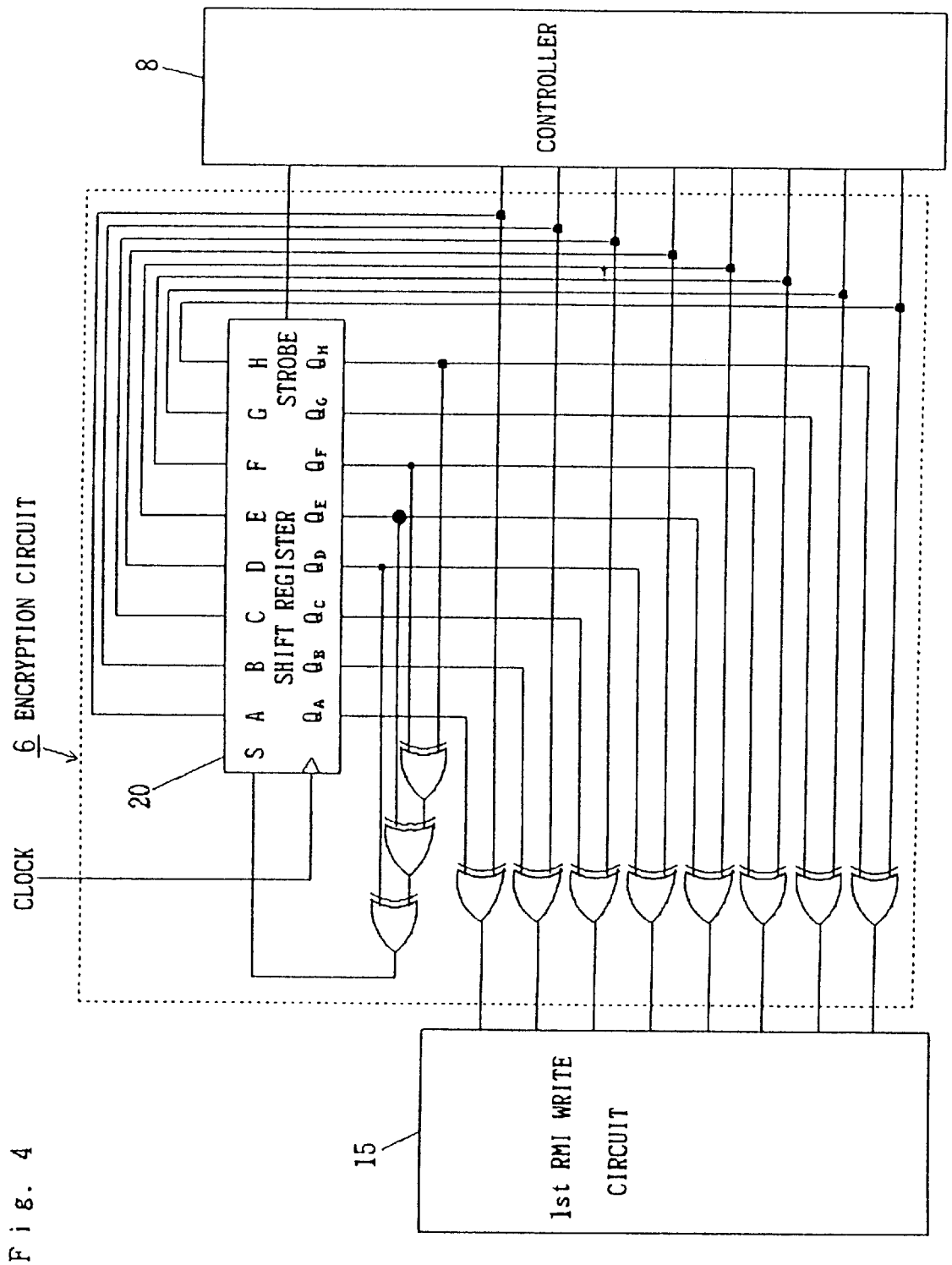
FIG. 4 is a block diagram showing a component example of an encryption circuit in the embodiment shown in FIG. 1.
Figure 5:
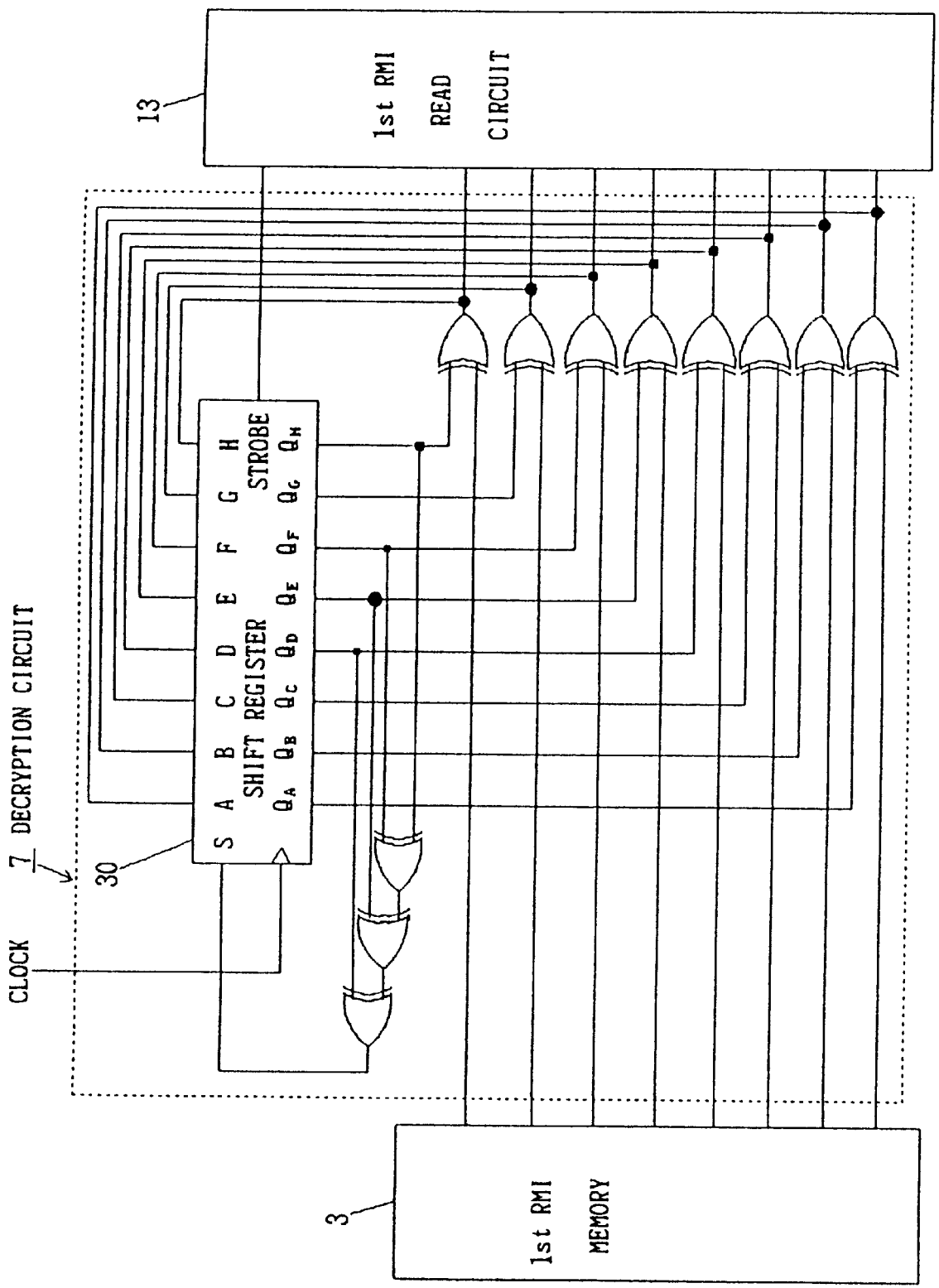
FIG. 5 is a block diagram showing a component example of a decryption circuit in the embodiment shown in FIG. 1.

The encryption circuit 6 can be constructed by a shift register 20 and an exclusive OR gates having such a feedback as shown in, for example, FIG. 4. The shift register 20 having the feedback loop to generate a pseudo-random sequence periodically in an order determined by a pattern of the feedback. The shift register 20 loads the key, and synchronizes it with a clock so as to shift it to generate the pseudo-random sequence where the key is made an initial value. The first RMI is encrypted in the following way in accordance with the pseudo-random sequence generated in a manner as mentioned-above. The controller 8 reads out the key from the temporary memory 11 so as to feed it to the encryption circuit 6. At the same time, the shift register 20 of the encryption circuit 6 loads the key with a strobe pulse to be outputted from the controller 8. Then, the controller 8 reads out the information of the first byte of the first RMI from the temporary memory 11 to feed it to the encryption circuit 6. The encryption circuit 6 encrypts the first byte of the first RMI by exclusive OR operation with the parallel output of the shift register 20 bit by bit. The encrypted first byte of the first RMI is stored into the first RMI memory 3.

A clock pulse is fed into the shift register 20 so as to generate the next random value. The second byte of the first RMI is encrypted with the next random value and stored in the first RMI memory 3 in the same manner as the first byte of the first RMI. This operation is repeated throughout the first RMI byte by byte. In this way the first RMI is encrypted and stored in the first RMI memory 3.

The encrypted first RMI can be decrypted by a decryption circuit 7 where an input and an output are replaced each other in the same construction as the encryption circuit 6. This is because the operation of the encryption circuit 6 is based on the exclusive OR and such an operation is restored to the original by repetition twice. Since the encryption circuit 6 is included in a reproducing apparatus and the decryption circuit 7 is included in the information carrier 1 in the embodiment, they are separately composed. When both the encryption circuit 6 and the decryption circuit 7 are included in the reproducing apparatus, they can be used in common with the same by the use of a switch of inputs and outputs. Also, when every byte of the first RMI is encrypted not with the pseudo-random sequence but simply with the key, the decryption circuit 7 installed into the information carrier consists of NOT gate(s) inserted into bit position(s) selected in accordance with the key.

Figure 6:
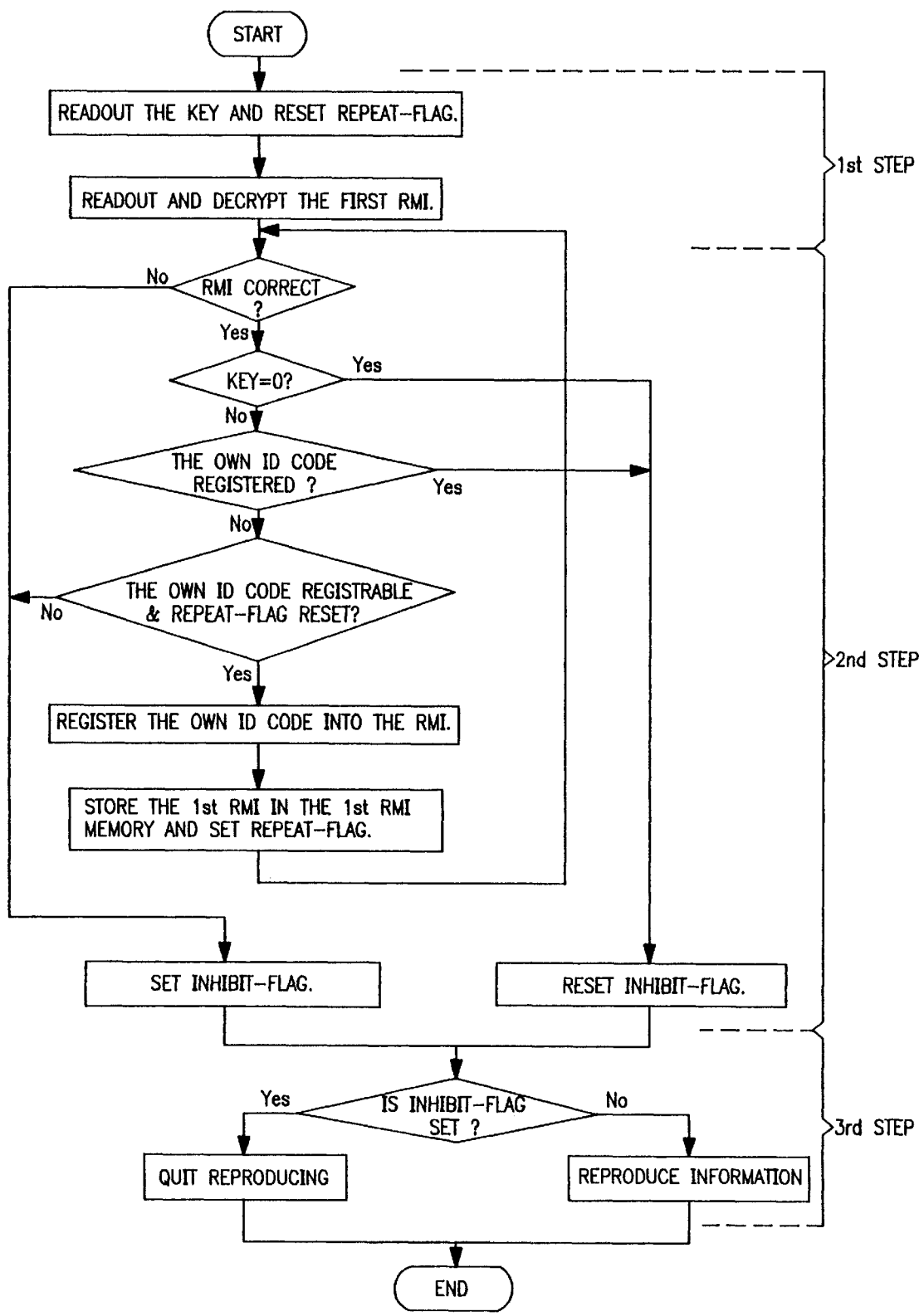
FIG. 6 is a flow chart showing an example of an operation of the embodiment of a reproducing apparatus of the present invention.

FIG. 6 is a flow chart showing in detail the reproducing operation of a reproducing apparatus in the present embodiment as constructed mentioned-above. The reproducing operation by the reproducing apparatus will be described with reference to FIG. 1 in accordance with the flow chart of FIG. 6. When a reproduction command is given to the controller 8, the controller 8 reads out the second RMI from the recorded medium 2 so as to store it in the temporary memory 11. If the key to be included in the second RMI is zero, it is judged that the free reproduction is permitted, and reproduction of the unit information from the recorded medium 2 starts immediately. When the key is not zero, the controller 8 sends the key to the decryption circuit 7. The encrypted first RMI stored in the first RMI memory 3 is decrypted by the decryption circuit 7 in accordance with the key. Then the decrypted first RMI is read out by the first RMI read circuit 13 to send it out to the controller 8, and the controller 8 stores the first RMI in the temporary memory 11. At this time, the controller 8 checks the CRC. If an error is detected through the CRC check, it is judged the RMI as unfairness, and the reproduction of the unit information is suspended. If no error is detected through CRC check, the controller 8 checks if the own ID code of the reproducing apparatus is included in the first RMI or not. If the own ID code is included, it is judged as to permit to reproduce the unit information from the recorded medium 2 and, the reproduction of the unit information from the recorded medium 2 starts. If the own ID code is not included in the first RMI, the remaining number for permitting the registration of the ID code included in the first RMI is checked. If the remaining number for permitting the registration of the ID code is zero, it is judged as to inhibit the reproduction of unit information, and the reproduction of the unit information is suspended. If the remaining number for permitting the registration of the ID code is 1 or more, the own ID code of the reproduction apparatus is registered, and the value showing the remaining number of the ID code for permitting the registration to be included in the first RMI is decreased by one. The first RMI in which the own ID code of the reproduction apparatus is registered is encrypted by the encryption circuit 6 and stored in the first RMI memory 3 by the first RMI write circuit 15. When the first RMI is read from the first RMI memory 3 again so that it is confirmed that the own ID code is registered, it is judged as to permit the reproduction of the unit information from the recorded medium 2, and, if the ID code is not yet registered, it is judged as to inhibit the reproduction of the unit information. When it is judged to permit the reproduction of the unit information, the controller 8 drives the reproducing means consisting of the read channel circuit 5 and an output circuit 16 to start the reproduction of the unit information from the recorded medium 2. The reproduction of the unit information is suspended when it is judged not to permit the reproduction and the own ID code is not registered.

When the ID code is registered in the first RMI in this manner, the reproducing apparatus to which the ID code is given is authorized as an apparatus capable of repeatedly reproducing the corresponding unit information from the information carrier 1. After the ID codes fill up the registrable registration block(s), the unit information is inhibited from being reproduced from the information carrier 1 by any reproducing apparatus which is not authorized. When the apparatus capable of reproduction is not restricted, the key is made zero in the present embodiment so as to show it. In this case, the first RMI memory 3 can be omitted.

The authorized reproducing apparatus adds the own ID code to the head of the outputting unit information when the unit information which does not permit free reproduction is reproduced from the information carrier 1 and is outputted in digital form. With this, the ID code of the reproducing apparatus can be registered in the first RMI of the information carrier of a copy destination when the reproducing signal is digitally copied. As the unit information copied in this manner can be reproduced only by the reproducing apparatus which has reproduced the original unit information of the copy, the copyrights can be effectively protected without restriction on the private copying operation. If the ID code is added to only the head of the output information, it is possible not to register the ID code of the reproducing apparatus onto the preceding copy in the case of copying from the halfway without receiving the head of the output information. Therefore, it is constructed in such that the ID code of the reproducing apparatus is adapted to be repeatedly inserted even middle part of the unit information, because the ID code of the reproducing apparatus may not be registered in the copy destination when the copying operation is effected from halfway without the reception of the head of the output information. If the outputted unit information is operated with respect to the ID code of the reproducing apparatus, illegal copy can be effectively prevented. The above described operation can use such as, for example, the exclusive OR.

Since the reproducing operation by the reproducing apparatus not authorized can be prohibited by the restriction of reproducing the unit information within the authorized reproducing apparatus(es), the copyrights can be prevented from being infringed by the circulation among many users.

A subsidiary storing means having the first RMI memory 3 is used in the above described embodiment, because the first RMI is adapted to be rewritten even if the recorded medium 2 is not capable of recording additional information but is capable of reproduction only. In conformity with this construction the RMI is divided into the first and the second RMI such that a portion necessary to write in the RMI is included in the first RMI, and the second RMI consists of only information not necessary to write. If the recorded medium 2 is writable, the subsidiary storing means is not required, because all the RMIs including the first RMI can be recorded on the recorded medium. If the recorded medium storing information in a form of micro-relief such as a compact disk, which is easy to store the large amount of information, includes a recordable portion to record the RMI, it is suitable for the embodiment of the present invention. A reproducing apparatus can be constructed so as to automatically read the first RMI from a recorded medium when the reproducing apparatus does not find the subsidiary storing means on an information carrier.

The key for encrypting the first RMI has been recorded on the recorded medium 2 so as to prevent the contents of the first RMI from being illegally changed with a simple apparatus for recording, reproducing the information only from the subsidiary storing means. However, a simple apparatus for reading and writing information only from and to the subsidiary storing means can restore the first RMI by returning the information which was read before from the subsidiary storing means as it was, and ID code registered in the first RMI can easily be cleared by this apparatus ever if the first RMI is encrypted. That is the reason why the decryption circuit 7 for decrypting the encrypted first RMI is mounted on the information carrier 1 and the encryption circuit 6 for encrypting the first RMI is mounted on the reproducing apparatus. Contrary to the present embodiment, the encryption circuit 6 may be mounted on the information carrier 1 so that the decryption circuit 7 is mounted on the reproducing apparatus. In this embodiment, the ID code storage 9 is detachable, in order that the ID code can be taken over when the reproducing apparatus is renewed by moving the ID code storage 9 of the old reproducing apparatus to the new reproducing apparatus. An user can also carry a right of reproducing the unit information from the information carrier 1 by carrying the ID code storage 9.

In the present embodiment, although it is confirmed that the own ID code is surely registered in the first RMI just after registration, the confirming operation may be omitted.

In the present embodiment, the value showing the remaining number of the registrable registration block(s) is included in the first RMI and is decreased by one for each registration operation, but the value may show the total number of the registrable registration block(s) instead, because the number of registration block(s) used for registration can be easily known through checking the contents of each registration block(s). In this case, it is not necessary to decrease the value showing the total registerable number for any registration operation. In this case, it can be known whether the registration of the ID code is permitted or not by the comparison between the value showing the total number of the registrable registration block(s) and the number of the registration block(s) used for registration.

Figure 7:
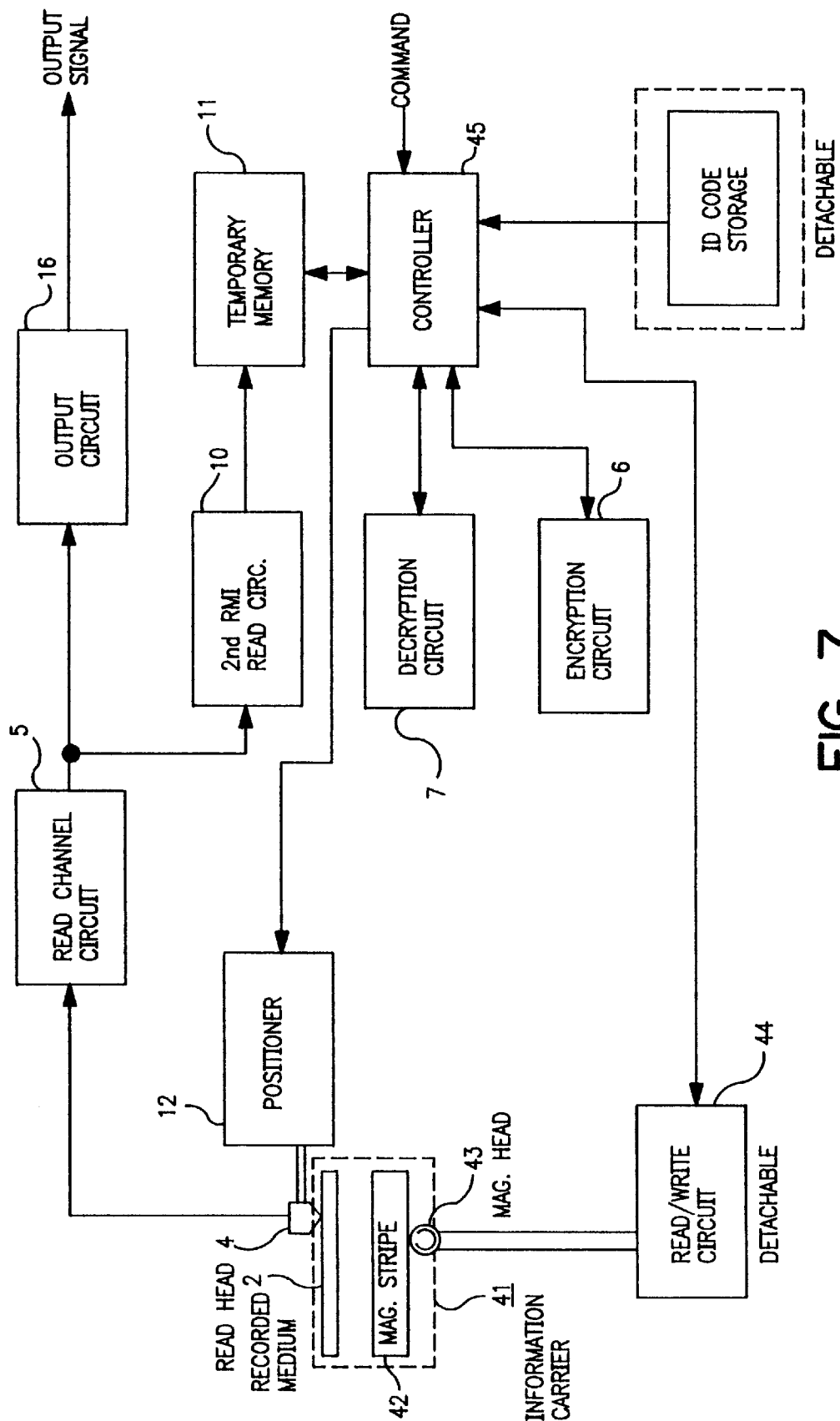
FIG. 7 is a block diagram showing another embodiment of the reproducing apparatus of the present invention.
Figure 8:
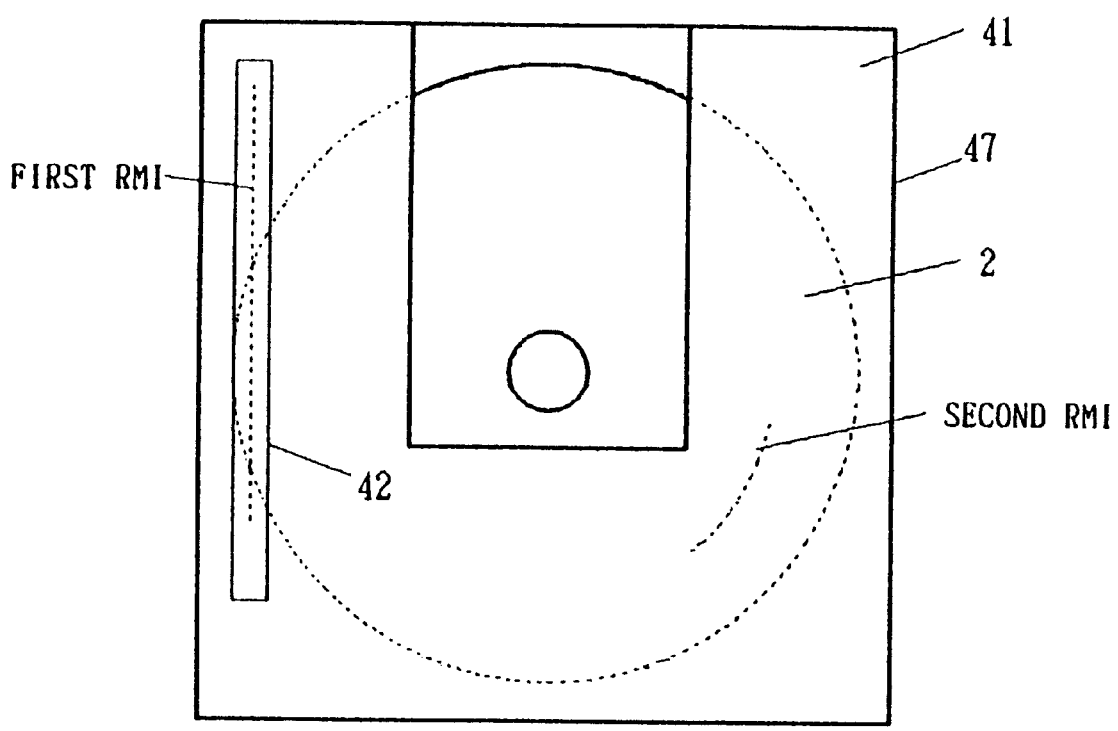
FIG. 8 is a conception view of the embodiment of an information carrier of the present invention.

FIG. 7 and FIG. 8 respectively show another embodiment of a reproducing apparatus and another embodiment of an information carrier to be used in this reproducing apparatus. In this information carrier 41, the subsidiary storing means is adapted to be magnetically recorded on the magnetic stripe 42 provided on a surface of a case 47 enclosing the recorded medium 2 with a magnetic head 43. When the information carrier 41 is being loaded in the reproducing apparatus, the magnetic head 43 scans the magnetic stripe 42 in the normal direction and picks up signals from the magnetic stripe 42. A read/write circuit 44 reads out the encrypted first RMI from a signal picked up by the magnetic head 43 so as to feed it to a controller 45.

The controller 45 once stores the above described encrypted first RMI in the temporary memory 11. When the loading operation of the information carrier 41 is completed, the second RMI is read out from the recorded medium 2 so as to also store it in the temporary memory 11 in the same manner as mentioned with FIG. 1. Thereafter, the controller 45 reads out the encrypted first RMI and the key from the temporally memory 11 to sent to the decryption circuit 7. The decryption circuit 7 decrypts the encrypted first RMI on the employment of the key included in the second RMI to return back to the controller 45. The controller 45 store the decrypt first RMI again into the temporally memory 11. This decrypted first RMI is used for controlling the reproducing operation in the same manner as shown in FIG. 1. When the first RMI stored in the temporary memory 11 is changed for registration of the own ID code, the changed first RMI is recorded on the magnetic stripe 42. This is carried out as follows. The controller 45 sequentially reads the changed first RMI from the temporary memory 11 so as to feed it to the encryption circuit 6. The encryption circuit 6 encrypts the fed first RMI in accordance with the key and return it to the controller 45. The controller 45 stores the encrypted first RMI again in the temporary memory 11. When the information carrier 41 is unloaded, the controller 45 reads in a reverse sequence from the bottom of the encrypted first RMI stored in the temporary memory 11 so as to feed it to the read/write circuit 44. The read/write circuit 44 drives the magnetic head 43 in accordance with the fed signal to record it on the magnetic stripe 42. When the information carrier 41 is unloaded, the magnetic stripe 42 is scanned in the reverse direction by the magnetic head 43, so that the encrypted first RMI read in the reverse sequence is recorded on the magnetic stripe in the reverse direction. Consequently the encrypted first RMI becomes arranged in the normal direction.

When a plurality of unit informations are recorded on the information carrier 1 (41) and each unit information has the first RMI respectively in the above described embodiments, the corresponding first RMI is referred in order to manage reproducing each of the unit informations.

Figure 9:
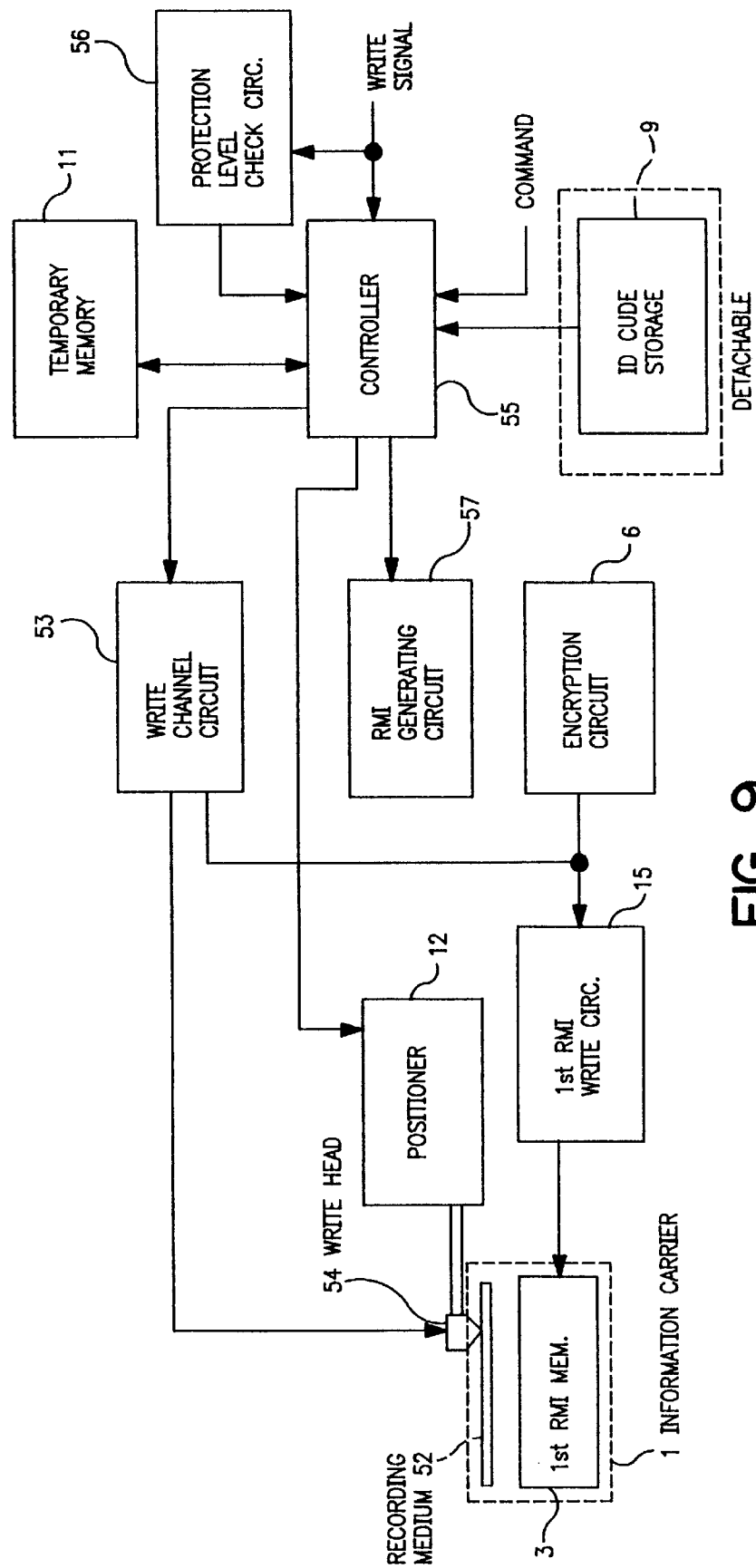
FIG. 9 is a block diagram showing the embodiment of a recording apparatus of the present invention.
Figure 10:
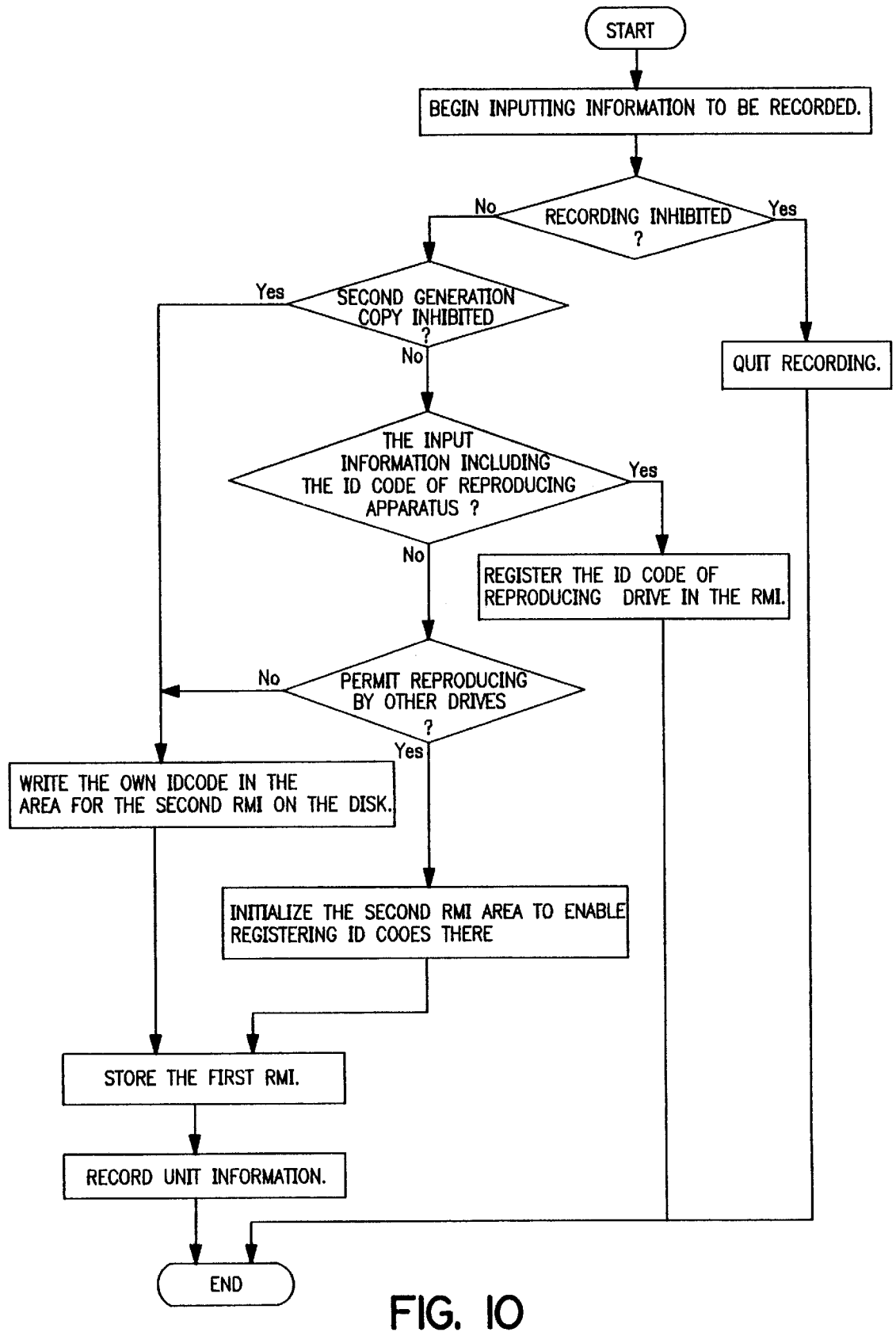
FIG. 10 is a flow chart showing an example of an operation of the embodiment of the recording apparatus of the present invention.

FIG. 9 shows an embodiment of a recording apparatus for recording the unit information on the information carrier capable of recording. FIG. 10 is a flow chart showing the operation when the unit information is recorded by the recording apparatus. The operation of the recording apparatus will be described hereinafter in accordance with the flow chart. When the instruction of the recording is given to the controller 55, and an unit information to be recorded is inputted, a protection level check circuit 56 checks whether the recording of unit information is inhibited or not. When the recording is inhibited, the protection level check circuit 56 outputs a record inhibition signal. When the recording is not inhibited but an information for inhibiting a copy from the recorded unit information is included, the protection level check circuit 56 outputs a copy inhibition signal. Also, the protection level circuit 56 is adapted to check whether an ID code is included within the unit information or not, and if it includes an ID code, the protection level circuit 56 outputs an ID code recognition signal and the ID code included in the unit information.

In the above described embodiment, a checking operation is adapted to be effected in an order whether the recording inhibition exists, the re-copy inhibition exists and the ID code exists in the unit information to be recorded. This order is not important. The controller 55 is operated as mentioned below in response to the output from the protection level check circuit 56.

(1) The recording operation is inhibited when the record inhibition signal is outputted.

(2) The ID code of the recording apparatus is recorded in the first RMI, when the copy inhibition signal is outputted, so that the other ID codes cannot be registered, by controlling an RIM generation circuit 57 to generate the RMI.

(3) The ID code outputted from the protection level check circuit 56 is recorded in the RMI corresponding to the unit information, when the ID code recognition signal is outputted, so that the other ID code cannot be registered, by controlling the RMI generation circuit 57 to generate the RMI.

(4) It is prompted to input a signal indicating an extent for permitting the reproduction when none of signal is outputted.

Then, the controller 55 sends the inputted unit information to a write channel circuit 53 except of the case that the record inhibition signal is outputted from the protection level check circuit 56. Both the write channel circuit 53 and a write head 54 are recorded the unit information sent from the controller 55 onto a recording medium 52.

As the first RMI is not required to be rewritten when free reproduction is permitted, and when the registration of the ID code of the other reproducing apparatus is not permitted, the first RMI can be recorded on the recording medium 52 by the write channel circuit 53 and the write head 54 because of being not necessary to rewrite the first RMI. In this case, the first RMI memory 3 can be omitted, also.

In order to record a plurality of unit informations on one information carrier 51, the above described operation can be repeated each time the recording operation is effected and individual first RMIs may be respectively generated.

Although the reproducing apparatus and the recording apparatus are described as separate apparatuses in FIG. 1 and FIG. 9, they may be integrated.

Figure 11:
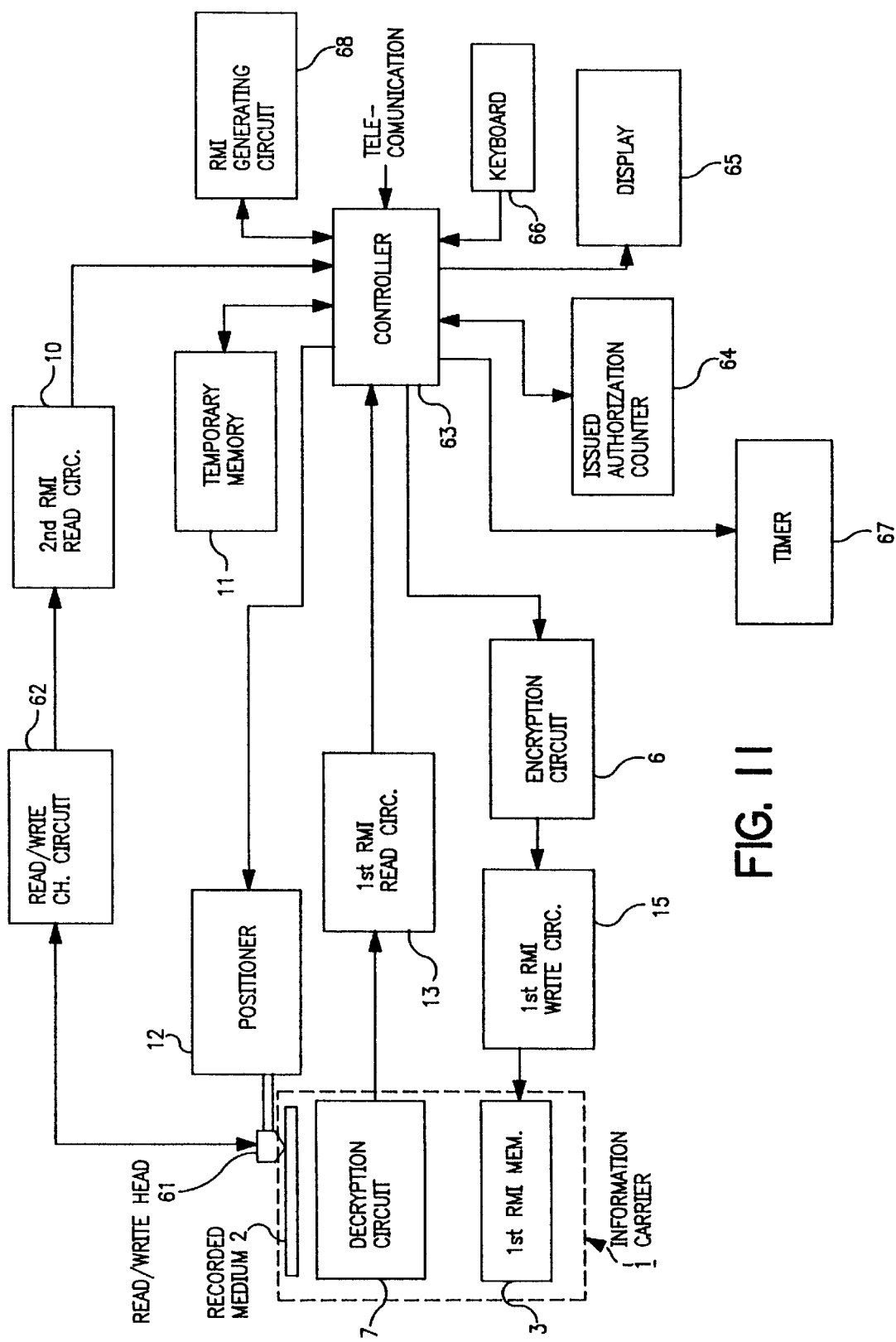
FIG. 11 is a block diagram showing the embodiment of an initializing apparatus of the information carrier of the present invention.
Figure 12:
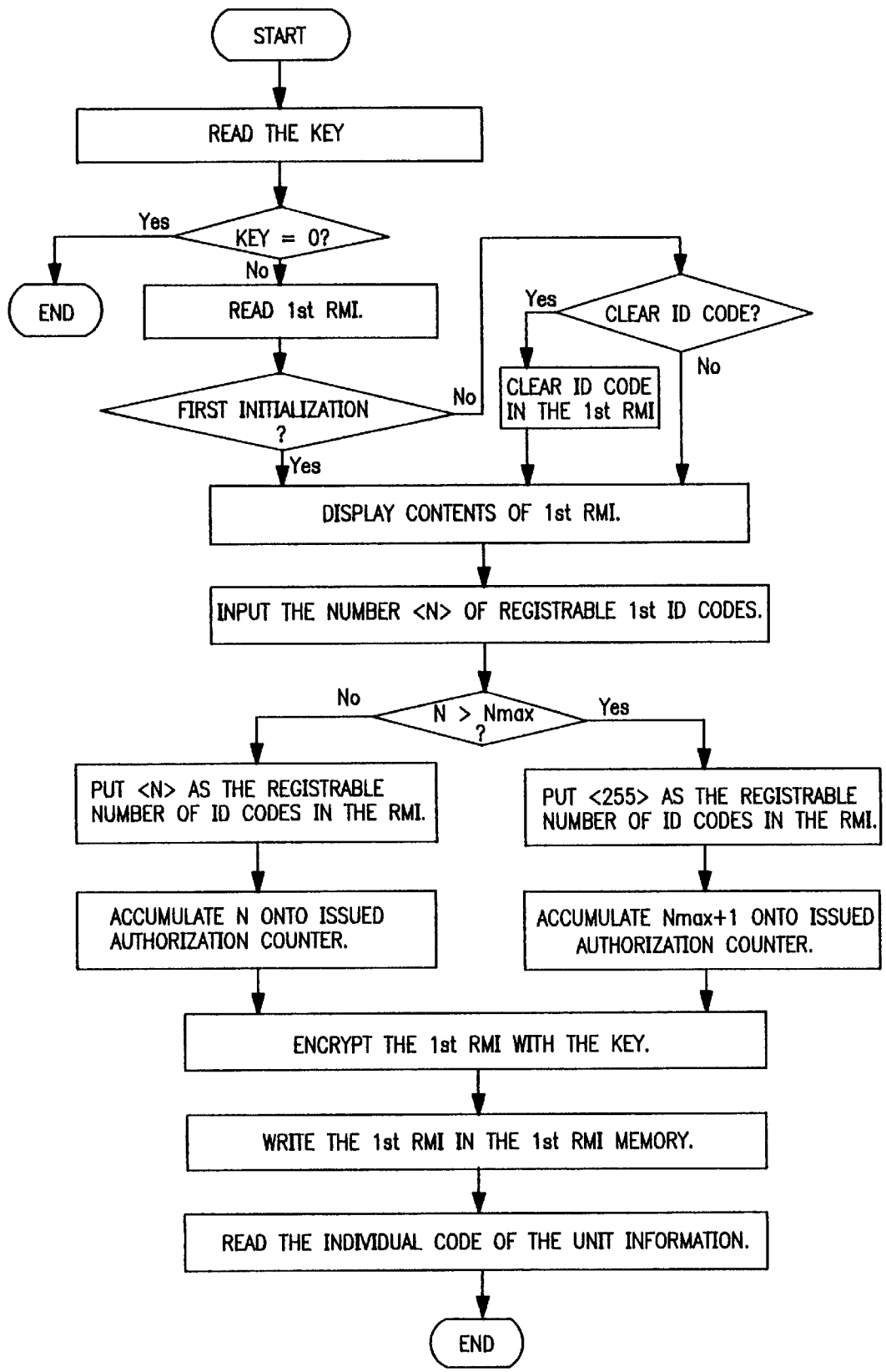
FIG. 12 is a flow chart showing the operation when the initializing apparatus of FIG. 11 initializes the first RMI.

FIG. 11 shows an embodiment of an initializing apparatus for generating or renewing the first RMI so as to record it on the information carrier. The apparatus is adapted to set the number of the apparatus(es) capable of recording for each of the information carriers so that the copyrights may be charged in accordance with the number thereof. FIG. 12 is a flow chart showing the operation of the initializing apparatus. When the operation starts, a controller 63 controls the positioner 12 so as to move a read/write head 61 to an area where the second RMI is recorded. The read/write head 61, a read/write circuit 62 and the second RMI read circuit 10 cooperate to read the second RMI from the recorded medium 2 so as to store it in the temporary memory 11. A method of reading the second RMI from the recorded medium 2 is the same as the reproducing apparatus of FIG. 1. When the key included in the second RMI is zero, information reproduction is not showing permission of free reproduction is displayed and complete the operation. If the key is not zero, the decryption circuit 7 decrypts the encrypted first RMI read from the first RMI memory 3 and outputs the decrypted first RMI. The decryption of the first RMI is effected by the method as that of the reproducing apparatus of FIG. 1 with the use of the key included in the second RMI.

In the information carrier before the initializing operation, the contents of the first RMI have been set to be all zero or the like. In this condition, the unit information cannot be reproduced yet. When it is recognized that the first RMI is not initialized yet, the controller 63 reads out an individual code of unit information included within the second RMI, and controls the RMI generation circuit 68 so as to record an initial information introduced from the individual code of the unit information onto each of the ID code registration block(s). The individual code is individually given to each unit information. Since the initial information is a value which does not exist as the ID code, a registration block where the ID code is registered and a registration block where it is not registered can be easily discriminated through checking existence of initial information in the registration block. As the individual code is known after the second RMI is read, it is difficult to erase the registered ID code to restore the registration block by simple apparatus without a second RMI read means. The generated first RMI is temporarily stored in the temporary memory 11. The controller 63 displays it on the display 65 so that the input of the number of the ID codes for permitting is prompted. The operator inputs from the keyboard 66 the number N for permitting the registration of the ID code of the apparatus. A maximum number Nmax of N is determined uniformly in advance or for each of types of the information carriers. When the numerical value N exceeding Nmax is inputted, it is assumed that the apparatus capable for reproduction is not restricted. When the N does not exceed the Nmax, the controller 63 writes on the first RMI on the temporary memory 11 with the number of the ID codes for permitting the registration being provided as N. In this way authorization for reproducing the unit information is issued. The controller 63 controls the issued authorization counter 64 so that the numerical value N may be integrated. The issued authorization counter 64 sorts the integration value of each type of the information carrier so as to add the N to the integration value corresponding to the type of the information carrier 1 in accordance with the instruction of the controller 63. When the N exceeds the Nmax, an apparatus capable of reproduction is not restricted so that information showing it is recorded in the first RMI. In order to show that the reproducing apparatus is not described, assume that the number of the ID codes for permitting the registration is made, for example, 255. In this case, the issued authorization counter 64 integrates a given value, for example, Nmax +1.

Even when the information carrier 1 is already initialized, the number for the ID codes for permitting the registration may be changed, and the registered ID code may be erased so as to initialized it again. In this case, the controller 63 reads the first RMI from the first RMI memory 3 so as to display on the display 65 the remaining number of the registrable registration block(s), the number of the ID codes already registered, a maximum value by which the number of the ID code(s) for permitting the additional registration can be increased, and so on. When an operator inputs an increment n of the ID code for permitting the registration or indicates the ID code(s) registered, the number of which is n, for erasing them (it) to make the registration block(s) registrable, the issued authorization counter 64 integrates the n.

When the first RMI is initialized or renewed in this manner, the first RMI is encrypted by the encryption circuit 6 and thereafter is stored in the first RMI memory 3 by the first RMI write circuit 15.

As the values stored in the above described issued authorization counter 64 show the total number of the apparatus where the reproduction has been permitted, copyright rates can be charged in accordance with the total number. As the registered ID code can be erased and re-initialized, the software can be repeatedly rented. As the total number of the apparatuses for permitting the reproduction is accumulated in the issued authorization counter 64, a rate in accordance with the actual results of the rental can be charged.

The controller 63 is connected with a communication line. The external apparatus can obtain the accumulated value of the issued authorization counter 64 through the communication line and clear it. The controller 63 starts a timer 67 by triggering from the external apparatus and makes the initializing apparatus inactive after the lapse of a given time period from the triggering operation. The initializing apparatus can be always placed under the surveillance of the external apparatus and the initializing apparatus can be prevented from being illegally used for a long period of time. When the abnormality of the first RMI is detected at the initializing time, a signal is fed to the issued authorization counter 64 so as to count the time of the abnormalities caused. The illegal change in the first RMI and the abnormality of the initializing apparatus can be watched strictly in this manner.

In the above described embodiment, the individual codes are written before the registration in every registration block(s). The individual code may be written only in registration block(s) which permit registration and, for example, zero may be written in the other registration block(s) where the registration is not permitted. The number of registrable registration block(s) is not required to be included in the first RMI in this case.

The first RMI is not required to be one in one information carrier. When a plurality of unit informations are recorded, independent first RMI can be generated for each of the respective unit informations and be stored in the first RMI memory 3.

Figure 13:
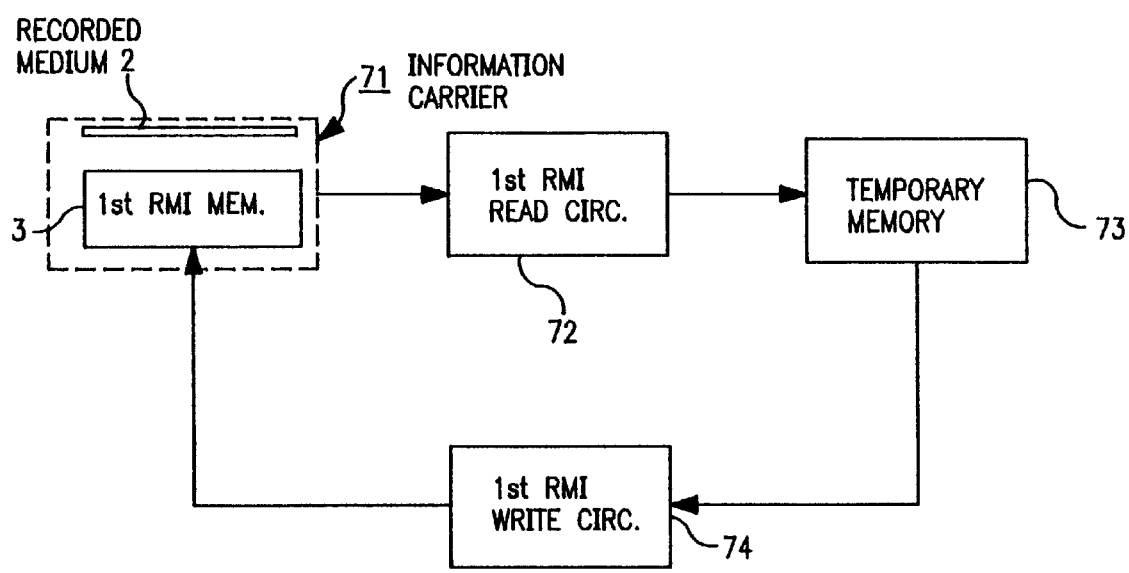
FIG. 13 is a block diagram of another embodiment of an initializing apparatus of the information carrier of the present invention.

FIG. 13 is a block diagram showing an apparatus for initializing the first RMI of the information carrier for testing the reproducing apparatus. Only the first RMI memory 3 is included in the semiconductor IC mounted on the information carrier 71. Neither of the encryption circuit and the description circuit is included in it. Before the information carrier 71 is reproduced by the producing apparatus for testing or the like, the contents of the first RMI memory 3 are read by the first RMI read circuit 72 to store it in the temporary memory 73. Thereafter, the information carrier 71 is test reproduced by the above described reproducing apparatus. The ID code of an apparatus tested is registered in the first RMI of the test-reproduced information carrier 71. The controller 72 reads the above described first RMI stored in the temporary memory 73 and returns it to the first RMI memory 3 so that the condition can be returned to the initialized condition before the reproduction. The information carrier 71 can be used frequently for the test reproduction. The first RMI write circuit 74 reads out the first RMI stored in the temporally memory 73 to return back to the first RMI memory 3, thereby to render to return back to the initialized state before renewing. With the simple construction of the initialized apparatus, it is possible for the information carrier 71 to use at many times to the test reproduction.

Although rewritable semiconductor IC memory is used as a subsidiary storing means in the embodiment of the above described initializing apparatuses, a magnetic memory or the other memory may be used. As the ID code once registered cannot be erased when a P-ROM capable of recording only once is used, illegal changes can be effectively prevented. When the P-ROM is used, the number of permitting the registrations of the ID codes can be restricted by writing 1 in all bits in a location where the registration is not permitted in the registration block of the ID code within the first RMI.

Although the information carrier having a recording surface on the disk has been described by way of example in each of the above described embodiments, a recording face may be provided on tape.

Although the first RMI is stored in the subsidiary storing means in the embodiment of the above described recording/reproducing apparatus or the initializing apparatus, the first RMI may be recorded on the recording medium when a portion which can be recorded is provided on the recording medium. In this case, the subsidiary storing means can be omitted so that the first RMI is required to be encrypted and stored no more.

Although the ID code tried to be written in the first RMI when an apparatus for permitting the reproduction is registered in the first RMI in the present embodiment, another value to be calculated from the ID code in a given sequence may be recorded.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A reproducing apparatus for reproducing main information comprising at least one unit information retrieved from an information carrier provided with a recorded medium for carrying the main information on it and a subsidiary storing area for storing a reproducing-management-information (RMI) according to each of the unit information in order to manage a reproduction operation of each of the unit information, said apparatus comprising:

reproducing means for reproducing the main information from a recording surface of the recorded medium of the information carrier, ID code storing means for storing a predetermined number, greater than one, of ID codes of reproducing apparatuses, each ID code individually given to the apparatus, on the subsidiary storing area of the information carrier as a part of the RMI without the use of an external apparatus, RMI reading means for reading the RMI from the subsidiary storing area of the information carrier, copy protection level checking means for checking a copy protection level of the unit information, ID code registration means for registering each of the ID codes by storing information corresponding to the ID code on the subsidiary storing area as a part of the RMI in accordance with the copy protection level, and control means for selecting and executing the reproducing operation of the main information or canceling reproduction for the reproducing means in accordance with the RMI and ID code;

wherein said control means:

activates the ID code registration means when a registering space is available on the subsidiary storing area and the ID code is not registered on the subsidiary storing area, activates the reproducing means to reproduce the unit information, and cancels the reproduction command when the ID code is not registered on the subsidiary storing area and the registering space for registering the ID code is not available, and wherein the RMI of the information carrier is divided into a first RMI and a second RMI, the subsidiary storing area is divided into a first portion for storing the first RMI disposed on a case enclosing the recorded medium in it and a second portion for storing the second RMI disposed on the recorded medium, wherein the second RMI includes a key for encrypting/decrypting at least one portion of the first RMI, the RMI reading means comprises a decryption means for decrypting at least one portion of the encrypted RMI in accordance with the key, and the ID code registration means comprises an encryption means for encrypting the RMI in accordance with the key.

2. A reproducing apparatus for reproducing main information comprising at least one unit information retrieved from an information carrier provided with a recorded medium for carrying the main information on it and a subsidiary storing area for storing a reproducing-management-information (RMI) according to each of the unit information in order to manage a reproduction operation of each of the unit information, said apparatus comprising:

reproducing means for reproducing the main information from a recording surface of the recorded medium of the information carrier, ID code storing means for storing a predetermined number, greater than one, of ID codes of reproducing apparatuses, each ID code individually given to the apparatus, on the subsidiary storing area of the information carrier as a part of the RMI without the use of an external apparatus, RMI reading means for reading the RMI from the subsidiary storing area of the information carrier, copy protection level checking means for checking a copy protection level of the unit information, ID code registration means for registering each of the ID codes by storing information corresponding to the ID code on the subsidiary storing area as a part of the RMI in accordance with the copy protection level, and control means for selecting and executing the reproducing operation of the main information or canceling reproduction for the reproducing means in accordance with the RMI and ID code;

wherein said control means:

activates the ID code registration means when a registering space is available on the subsidiary storing area and the ID code is not registered on the subsidiary storing area, activates the reproducing means to reproduce the unit information, and cancels the reproduction command when the ID code is not registered on the subsidiary storing area and the registering space for registering the ID code is not available, and wherein the RMI of the information carrier is divided into a first RMI and a second RMI, the subsidiary storing area is divided into a first portion for storing the first RMI disposed in a semiconductor IC mounted on a case enclosing the recorded medium and a second portion for storing the second RMI disposed on the recorded medium, said semiconductor IC comprises an encryption means for encrypting at least a part of the first RMI, the second RMI comprises a key for decrypting the encrypted RMI portion, and the RMI reading means comprises a decryption means for decrypting, in accordance with the key, the encrypted RMI portion read from the semiconductor IC.

3. A reproducing apparatus for reproducing main information comprising at least one unit information retrieved from an information carrier provided with a recorded medium for carrying the main information on it and a subsidiary storing area for storing a reproducing-management-information (RMI) according to each of the unit information in order to manage a reproduction operation of each of the unit information, said apparatus comprising:

reproducing means for reproducing the main information from a recording surface of the recorded medium of the information carrier, ID code storing means for storing a predetermined number, greater than one, of ID codes of reproducing apparatuses, each ID code individually given to the apparatus, on the subsidiary storing area of the information carrier as a part of the RMI without the use of an external apparatus, RMI reading means for reading the RMI from the subsidiary storing area of the information carrier, copy protection level checking means for checking a copy protection level of the unit information, ID code registration means for registering each of the ID codes by storing information corresponding to the ID code on the subsidiary storing area as a part of the RMI in accordance with the copy protection level, and control means for selecting and executing the reproducing operation of the main information or canceling reproduction for the reproducing means in accordance with the RMI and ID code;

wherein said control means:

activates the ID code registration means when a registering space is available on the subsidiary storing area and the ID code is not registered on the subsidiary storing area, activates the reproducing means to reproduce the unit information, and cancels the reproduction command when the ID code is not registered on the subsidiary storing area and the registering space for registering the ID code is not available, and wherein the RMI is divided into a first RMI and a second RMI, the subsidiary storing area is divided into a first portion for storing the first RMI disposed in a semiconductor IC mounted on a case enclosing the recorded medium and a second portion for storing the second RMI disposed on the recorded medium, said semiconductor IC comprises a decryption means for decrypting and outputting an encrypted first RMI, the second RMI comprises a key for encrypting the first RMI, and the ID code registration means comprises an encryption means for encrypting the first RMI in accordance with the key.

4. A reproducing apparatus for reproducing main information comprising at least one unit information retrieved from an information carrier provided with a recorded medium for carrying the main information on it and a subsidiary storing area for storing a reproducing-management-information (RMI) according to each of the unit information in order to manage a reproduction operation of each of the unit information, said apparatus comprising:

reproducing means for reproducing the main information from a recording surface of the recorded medium of the information carrier, ID code storing means for storing a predetermined number, greater than one, of ID codes of reproducing apparatuses, each ID code individually given to the apparatus, on the subsidiary storing area of the information carrier as a part of the RMI without the use of an external apparatus, RMI reading means for reading the RMI from the subsidiary storing area of the information carrier, copy protection level checking means for checking a copy protection level of the unit information, ID code registration means for registering each of the ID codes by storing information corresponding to the ID code on the subsidiary storing area as a part of the RMI in accordance with the copy protection level, and control means for selecting and executing the reproducing operation of the main information or canceling reproduction for the reproducing means in accordance with the RMI and ID code;

wherein the control means:
i) outputs the ID code read from the ID code storing means and the unit information reproduced from the information carrier in digital form; and
ii) controls the outputting of the unit information in accordance with the ID code of the reproduction apparatus.

5. An initializing apparatus for initializing a reproducing-management-information (RMI) on an information carrier provided with a recorded medium for carrying main information comprising at least one unit information and a subsidiary storing area for storing, for each of the unit information, the RMI for managing the reproducing of each of the unit information, said apparatus comprising:

RMI generating means for generating at least one portion of the RMI so that a number of ID codes that are permitted registration may be increased by at least one, accumulating means for accumulating the number of ID codes that are permitted registration, and RMI writing means for writing on the subsidiary storing area at least one portion of the generated RMI, wherein the subsidiary storing area stores a predetermined number, greater than one, of ID codes, and wherein the RMI of the information carrier is divided into a first RMI and a second RMI, and the subsidiary storing area is divided into a first portion for storing the first RMI disposed on a case enclosing the recorded medium and a second portion for storing the second RMI disposed on the recorded medium, key reading means for extracting a key from a signal reproduced from the second RMI is further provided, the RMI generating means generates the first RMI and encrypts it in accordance with the key read by the key reading means, and the RMI writing means writes the first RMI produced by the RMI generating means on the portion of the subsidiary storing area disposed on the case.

6. An information carrier comprising:

an information recorded medium accommodating a main information storing area for recording main information including at least one unit information; and a subsidiary storing means having a subsidiary storing area for storing reproduction management information (RMI) which includes an ID code given individually for a predetermined number of individual reproducing apparatus to be registered for each unit information, wherein the main information is recorded, in a non-rewritable form, on the information recorded medium;

wherein said subsidiary storing means has first and second subsidiary storing areas for storing first and second reproduction management information, respectively, said first reproduction management information including an ID code given for individual reproducing apparatus, and said second reproduction management information including an encryption/decryption key for encrypting/decrypting the first reproduction management information, and wherein said second subsidiary storing area is disposed on the information recorded medium.

7. An information carrier comprising:

an information recorded medium accommodating a main information storing area for recording main information including at least one unit information; and a subsidiary storing means having a subsidiary storing area for storing reproduction management information (RMI) which includes an ID code given individually for a predetermined number of individual reproducing apparatus to be registered for each unit information, wherein the main information is recorded, in a non-rewritable form, on the information recorded medium;

wherein said subsidiary storing means has first and second subsidiary storing areas for storing first and second reproduction management information, respectively, said first reproduction management information including an ID code given for individual reproducing apparatus, and said second reproduction management information including an encryption/decryption key for encrypting/decrypting the first reproduction management information, and wherein said second subsidiary storing area is disposed on the information recorded medium;

wherein said first subsidiary storing area is a substantially non-volatile memory which is provided in a semiconductor IC disposed in the information carrier.

8. An information carrier as defined in claim 7, wherein said semiconductor IC includes a decryption means for decrypting the first reproduction management information encrypted with the encryption/decryption key.

9. An information carrier as defined in claim 7, wherein said semiconductor IC includes an encryption means for encrypting the first reproduction management information with the encryption/decryption key.

10. An information carrier comprising:

an information recorded medium accommodating a main information storing area for recording main information including at least one unit information; and a subsidiary storing means having a subsidiary storing area for storing reproduction management information (RMI) which includes an ID code given individually for a predetermined number of individual reproducing apparatus to be registered for each unit information, wherein the main information is recorded, in a non-rewritable form, on the information recorded medium;

wherein said subsidiary storing means has first and second subsidiary storing areas for storing first and second reproduction management information, respectively, said first reproduction management information including an ID code given for individual reproducing apparatus, and said second reproduction management information including an encryption/decryption key for encrypting/decrypting the first reproduction management information, and wherein said second subsidiary storing area is disposed on the information recorded medium; wherein said second subsidiary storing area is disposed in the main information storing area on the information recorded medium.

* * * * *